3,193,398
MASTIC COMPOSITIONS
Joseph Iannicelli, Macon, Ga., assignor to J. M. Huber Corporation, Locust, N.J., a corporation of New Jersey
No Drawing. Filed July 9, 1963, Ser. No. 293,850
17 Claims. (Cl. 106—33)

This application is a continuation-in-part of U.S. application Serial No. 185,869, filed April 9, 1962, now abandoned.

This invention relates to hydrocarbon mastic compositions filled with surface modified kaolin clays. More specifically, this invention relates to mastics in which the fillers are kaolin clays modified with metallo-organic complex compounds of the Werner type in which trivalent nuclear chromium or zirconium atoms are coordinated with carboxylic acid groups having at least three carbon atoms.

Kaolin clays modified in accordance with this invention are altered to the extent that the clays become hydrophobic and organophilic and, as a filler, impart these properties to mastics such as adhesives, caulking compounds, putties, sealers and the like.

The mastic products of this invention are used as fillers in many applications where hydrophobicity and organophilicity are desirable; for example, in paper, plastics, paints, and greases.

An object of this invention is to provide hydrophobic, organophilic mastics which are resistant to hydrocarbon solvents.

Another object of this invention is to provide mastics filled with a surface modified hydrophobic, organophilic kaolin clay.

Other objects and advantages will be apparent from the following specifications.

Since many mastics such as adhesives, sealers, and caulking compounds are constantly exposed to a variety of atmospheric conditions, it is important that they exhibit stability towards water, oil, hydrocarbon solvents, and other liquids and vapors while maintaining their plasticity without shrinkage due to aging.

I have discovered that kaolin clays when modified with metallo-organic complex compounds of the Werner type (as described and disclosed in U.S. Patents 2,273,040, 2,356,161, and 2,597,721 assigned to E. I. du Pont de Nemours and Company) and used as fillers for mastic compositions, impart the described desirable properties thereto.

The Werner-type complex compounds which are useful for modifying kaolin clays are typically those formed from chromic or zirconium chloride and carboxylic acids such as furoic acid, oleic acid, methacrylic acid, stearic acid, crotonic acid, acrylic acid, sorbic acid and the like. The carboxylic acid preferably contains less than 24 carbon atoms.

The kaolin clays usable in the practice of this invention are those refined kaolin clays which are known and used as fillers in rubber compounds, paper, plastics and paints.

The process by which the kaolin clays are modified is readily accomplished by adding the Werner complex to a stirred clay slip, filtering the slurry, and recovering the product which is then dried. In this manner any desired amount of modifier may be utilized on the kaolin clay pigment.

The amount of Werner complex used to modify the kaolin varies with the intended use of the pigment and the efficiency of the results. For convenience and economics, it is usually not feasible to use more than 10% by weight of the modifier to achieve optimum results in terms of hydrophobicity.

Usually when kaolin clays, either modified or unmodified are incorporated into mastic compositions as fillers, they act as bodying or thickening agents. If, for example the kaolin clay is rendered organophilic by chemical modification, the mastic into which it is incorporated becomes water resistant but disintegrates in hydrocarbon solvents. Mastics filled with unmodified kaolin clays disintegrate in water very quickly. The Werner complex modified kaolin clays of this invention impart to mastic compositions a resistance to both water and hydrocarbon solvents. Laboratory tests show that when the mastic compositions of this invention are exposed to either water or a hydrocarbon solvent, no disintegration takes place, indicating the solvent stability of the composition.

The mastic compositions into which the modified clay is incorporated are polybutene mastics. These mastics are prepared by catalytic polymerization of normal and branched chained butenes. Butenes polymerize readily in the presence of acidic catalysts and under controlled conditions of temperature form long branched-chain molecules having terminal unsaturation only.

The polybutenes useful as mastic in the practice of this invention are pale colored, chemically inert liquids and are permanently fluid with molecular weights ranging from about 400 to about 2,400. Examples of this type of polybutene are the Oronite polybutenes.

The amount of modified kaolin clay incorporated into the polybutene mastic composition is advantageously from about 40% to 60% by weight based on the weight of the mastic composition.

The following examples are illustrative only and are not intended to limit the scope of the invention.

EXAMPLE 1

A slurry of 500 grams of "Suprex" (an air floated South Carolina hard kaolin clay, mined and refined by J. M. Huber Corporation) was formed in 1500 ml. of water by rapid agitation and the slurry was adjusted to pH 4.0. 5 grams of a 30% solution of stearato chromic chloride in isopropanol, sold under the trade name "Quilon," was added to the slurry and the reaction mixture was agitated for 15 minutes and then filtered. The filter cake was washed, dried and pulverized. A white hydrophobic organophilic powder was recovered.

EXAMPLE II

The procedure of Example I was repeated using 2½ grams of the stearato chromic chloride in a 30% isopropanol solution. The product recovered was a white hydrophobic organophilic powder.

EXAMPLE III

The procedure of Example I was repeated using 25 grams of the chromium complex in a 30% isopropanol solution. The product recovered was a white hydrophobic organophilic powder.

EXAMPLE IV

One hundred grams of "Suprex" kaolin clay was added with agitation to a stainless steel beaker containing one hundred grams of polybutene (Oronite Polybutene #32, molecular weight, average 1,190; viscosity index 117; pour point, 40° F.). A mastic composition resulted.

EXAMPLE V

One hundred grams of "Suprex" kaolin clay modified with 1% by weight of stearato chromic chloride was added with agitation to a stainless steel beaker containing one hundred grams of polybutene. A hydrophobic, solvent resistant mastic composition resulted.

EXAMPLE VI

The process of Example V was repeated using kaolin clay modified with 0.5% by weight of stearato chromic chloride. A hydrophobic, solvent resistant mastic composition resulted.

To compare the properties of kaolin modified with stearato chromic chloride with untreated kaolin, the mastics from Examples IV and V were formed into ½ inch balls which were each immersed in separate two-ounce bottles containing 30 ml. of water. The bottles were shaken after one hour of immersion and the turbidity was noted. 15 ml. of water was withdrawn from each bottle and replaced with 15 ml. of naphtha (boiling point 240–290° F.). The bottles were again shaken and then stored for one hour. Results of this test are shown in Table I.

*Table I.—Percent weight gain of mastic balls*

| Filler | 1 hour in Water | 1 hour in Naphtha/ Water (1:1) | 1 hour in Water Plus 1 hour in Naphtha/ Water [1] |
|---|---|---|---|
| 1% Quilon/Suprex | 54 | 16 | 36 |
| Untreated Suprex [2] | 96 | 65 | 66 |

[1] 50% water replaced with naphtha after one hour and exposure continued one hour.
[2] All mastics containing untreated "Suprex" disintegrated in these tests, whereas mastics from modified clays were intact.

From these tests, it is evident that kaolin clay modified with "Quilon" imparts desirable solvent-resisting properties to polybutene mastic compositions.

Other mastics in which the "Quilon-treated Suprex" gave similar desirable results are: polyolefin mastics including polypentene and polyhexene; vegetable oil mastics including linseed oil, cottonseed oil and corn oil; mineral oil mastics and chlorinated napthalene mastics.

Having thus described the preferred embodiments of the invention for purposes of illustration, it should be understood that other modifications may be resorted to without departing from the scope of the appended claims.

I claim:

1. An organic mastic composition selected from the group consisting of polyolefin, vegetable oil, mineral oil and chlorinated naphthalene consisting essentially of said organic and kaolin clay, said kaolin clay modified with from 0.1% to 10%, based on the weight of the clay, of an organo-metallic complex of a chromium salt and a carboxylic acid containing up to 24 carbon atoms.

2. A mastic composition according to claim 1 wherein the organo-metallic complex is stearato chromic chloride.

3. A mastic composition according to claim 1 wherein the organo-metallic complex is oleato chromic chloride.

4. A polyolefin mastic composition consisting essentially of said polyolefin and from 40% to 60% by weight of kaolin clay modified with from 0.1% to 10%, based on the weight of the clay, of an organo-metallic complex of a chromium salt and a carboxylic acid containing up to 24 carbon atoms.

5. A polyolefin mastic composition according to claim 1 wherein the organo-metallic complex is stearato chromic chloride.

6. A polyolefin mastic composition according to claim 1 wherein the organo-metallic complex is oleato chromic chloride.

7. A polybutene mastic composition consisting essentially of said polybutene and from 40% to 60% by weight of kaolin clay modified with from 0.1 to 10%, based on the weight of the clay, of an organo-metallic complex of a chromium salt and a carboxylic acid containing up to 24 carbon atoms.

8. A polypentene mastic composition consisting essentially of said polypentene and from 40% to 60% by weight of kaolin clay modified with from 0.1% to 10%, based on the weight of the clay, of an organo-metallic complex of a chromium salt and a carboxylic acid containing up to 24 carbon atoms.

9. A polyhexene mastic composition consisting essentially of said polyhexene and from 40% to 60% by weight of kaolin clay modified with from 0.1% to 10%, based on the weight of the clay, of an organo-metallic complex of a chromium salt and a carboxylic acid containing up to 24 carbon atoms.

10. A vegetable oil mastic composition consisting essentially of said vegetable oil and from 40% to 60% by weight of kaolin clay modified with from 0.1% to 10%, based on the weight of the clay, of an organo-metallic complex of a chromium salt and a carboxylic acid containing up to 24 carbon atoms.

11. A vegetable oil mastic composition according to claim 10 wherein the organo-metallic complex is stearato chromic chloride.

12. A vegetable oil mastic composition according to claim 10 wherein the organo-metallic complex is oleato chromic chloride.

13. A mineral oil mastic composition consisting essentially of said mineral oil and from 40% to 60% by weight of kaolin clay modified with from 0.1% to 10%, based on the weight of the clay, of an organo-metallic complex of a chromium salt and a carboxylic acid containing up to 24 carbon atoms.

14. A linseed oil mastic composition consisting essentially of said linseed oil and from 40% to 60% by weight of kaolin clay modified with from 0.1% to 10%, based on the weight of the clay, of an organo-metallic complex of a chromium salt and a carboxylic acid containing up to 24 carbon atoms.

15. A cottonseed oil mastic composition consisting essentially of said cottonseed oil and from 40% to 60% by weight of kaolin clay modified with from 0.1% to 10%, based on the weight of the clay, of an organo-metallic complex of a chromium salt and a carboxylic said containing up to 24 carbon atoms.

16. A corn oil mastic composition consisting essentially of said corn oil and from 40% to 60% by weight of kaolin clay modified with from 0.1% to 10%, based on the weight of the clay, of an organo-metallic complex of a chromium salt and a carboxylic acid containing up to 24 carbon atoms.

17. A chlorinated naphthalene mastic composition consisting essentially of said chlorinated naphthalene and from 40% to 60% by weight of kaolin clay modified with from 0.1% to 10%, based on the weight of the clay, of an organo-metallic complex of a chromium salt and a carboxylic acid containing up to 24 carbon atoms.

References Cited by the Examiner

UNITED STATES PATENTS

| | | | |
|---|---|---|---|
| 2,769,721 | 11/56 | Frankl | 106—308 |
| 2,884,402 | 4/59 | Bachman et al. | 106—308 |
| 2,885,360 | 5/59 | Haden et al. | 106—253 |
| 3,025,179 | 3/62 | Holbein | 260—37 |
| 3,032,431 | 5/62 | Ferrgno | 106—308 |

ALEXANDER H. BRODMERKEL, *Primary Examiner.*